(12) United States Patent
Miller et al.

(10) Patent No.: US 11,199,834 B2
(45) Date of Patent: *Dec. 14, 2021

(54) PERSISTENT AUTHENTICATION IN DYNAMIC AUTOMATION VISUALIZATION CONTENT DELIVERY

(71) Applicant: ROCKWELL AUTOMATION TECHNOLOGIES, INC., Mayfield Heights, OH (US)

(72) Inventors: Scott A. Miller, Oakdale, PA (US); Jerome R. Anderson, Mission Viejo, CA (US); Randy A. Cannady, Canton, GA (US); Timothy A. Caine, Cumming, GA (US); Michael J. Anthony, Milwaukee, WI (US); Douglas A. Coulter, Buford, GA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,233

(22) Filed: Apr. 24, 2020

(65) Prior Publication Data

US 2020/0249665 A1      Aug. 6, 2020

Related U.S. Application Data

(63) Continuation of application No. 15/720,728, filed on Sep. 29, 2017, now Pat. No. 10,635,093.

(51) Int. Cl.
*G05B 23/02* (2006.01)
*G06Q 10/06* (2012.01)
(Continued)

(52) U.S. Cl.
CPC ......... *G05B 23/0216* (2013.01); *G06Q 10/06* (2013.01); *H04L 9/32* (2013.01);
(Continued)

(58) Field of Classification Search
CPC ...... G05B 23/0216; G06Q 10/06; H04L 9/32; H04L 9/3226; H04L 67/125
(Continued)

(56) References Cited

U.S. PATENT DOCUMENTS 6,167,464 A      12/2000   Kretschmann
10,635,093 B2 *  4/2020    Miller .................. H04L 67/125
(Continued)

*Primary Examiner* — Zi Ye
(74) *Attorney, Agent, or Firm* — Fletcher Yoder, P.C.

(57) ABSTRACT

A human interface technique is disclosed for industrial automation systems. The technique allows for visualizations to be distributed to interfaces, such as thin client interfaces, from automation components. For access to the content, a user may be initially authenticated in a first manner, such as by multi-factor authentication. Thereafter, or for a certain time or location, the user may be authenticated by a reduced number of factors, such as single-factor authentication. The authentication may be used to deliver the visualizations based on policies of a visualization manager, such as the user identification, the user role, the user location, and so forth. The reduced factor authentication allow for users to freely move and view visualizations on any available device, or at different locations, and so forth, but still based on the policies.

19 Claims, 10 Drawing Sheets

(51) Int. Cl.
*H04L 29/08* (2006.01)
*H04L 9/32* (2006.01)
*H04L 29/06* (2006.01)

(52) U.S. Cl.
CPC .......... *H04L 9/3226* (2013.01); *H04L 67/125* (2013.01); *H04L 67/38* (2013.01)

(58) Field of Classification Search
USPC ........................................................ 709/217
See application file for complete search history.

(56) References Cited

U.S. PATENT DOCUMENTS

| | | | |
|---|---|---|---|
| 2007/0078658 A1* | 4/2007 | Virji ........................ | G10L 15/26 704/275 |
| 2007/0185967 A1* | 8/2007 | Hayes, Jr. ............ | G06Q 10/107 709/208 |
| 2012/0242648 A1* | 9/2012 | Baier .................... | G05B 19/409 345/418 |
| 2013/0042309 A1* | 2/2013 | Ozzie ..................... | G06Q 20/02 726/5 |
| 2014/0373117 A1 | 12/2014 | Le Saint | |

* cited by examiner

PERSISTENT AUTHENTICATION IN DYNAMIC AUTOMATION VISUALIZATION CONTENT DELIVERY

CROSS-REFERENCE TO RELATED APPLICATIONS

This application is a continuation of U.S. patent application Ser. No. 15/720,728, filed Sep. 29, 2017, entitled "PERSISTENT AUTHENTICATION IN DYNAMIC AUTOMATION VISUALIZATION CONTENT DELIVERY," which is incorporated by reference

BACKGROUND

This disclosure relates generally to human machine interfaces, such as those used in industrial automation systems.

Advances in automation systems have enabled coordinated control and monitoring of a wide range of machines and processes. Modern industrial automation is commonly based on computer control of motors, valves, and other actuators based upon preset programming, modeling, sensing and feedback of many different parameters from sensors and monitors, typically depending upon the machine or process being controlled. Operators interact with the systems in control rooms, but increasingly by local or mobile devices that may be positioned in any convenient location. Remote control and monitoring is also common.

In all such applications, human operators need some type of interface with which to interact (e.g., monitor, control, analyze, examine) the machine or process. In conventional industrial automation environments, such interaction is often performed via a human machine interface, sometimes referred to as an "HMI". These often are based on screens that are pre-defined and stored on a monitor-like device. The screens may show diagrams of the controlled machine or process, components, values, process flows, and so forth. In some cases, the screens allowed for the user to interact via touching one or more designated locations on the screen, or through other input devices. Different screens or pages can often be accessed in this way, such as to view different aspects of the machine or process, feedback, process data, performance data, and so forth.

Increasingly, mobile devices and "thin clients" have been used in such settings. The migration to such devices removes some or all of the executable payload from the interface device, but allows for added flexibility, particularly where the interface device is small or mobile. However, even in such environments, the interface devices still simply reproduce views or screens that are served by the originating devices, such as automation controllers, HMI's, cameras, and so forth. There remains a need to improvements in such interfaces and interface technologies that provide enhanced functionality, ease of use, data sharing, and so forth. There is a keen need for solutions that may permit increased utility offered by such technology.

BRIEF DESCRIPTION

By way of example, in accordance with certain aspects of the disclosed techniques, a system comprises a visualization manager that, in operation, communicates with a thin client HMI to permit the thin client HMI to access and display visualizations from one or more industrial automation visualization sources of a controlled machine or process. The visualization manager is configured to provide initial user access to at least one of the visualizations based initially upon a first type of user authentication data and thereafter permits subsequent access to at least one of the visualizations based upon a second type of user authentication data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
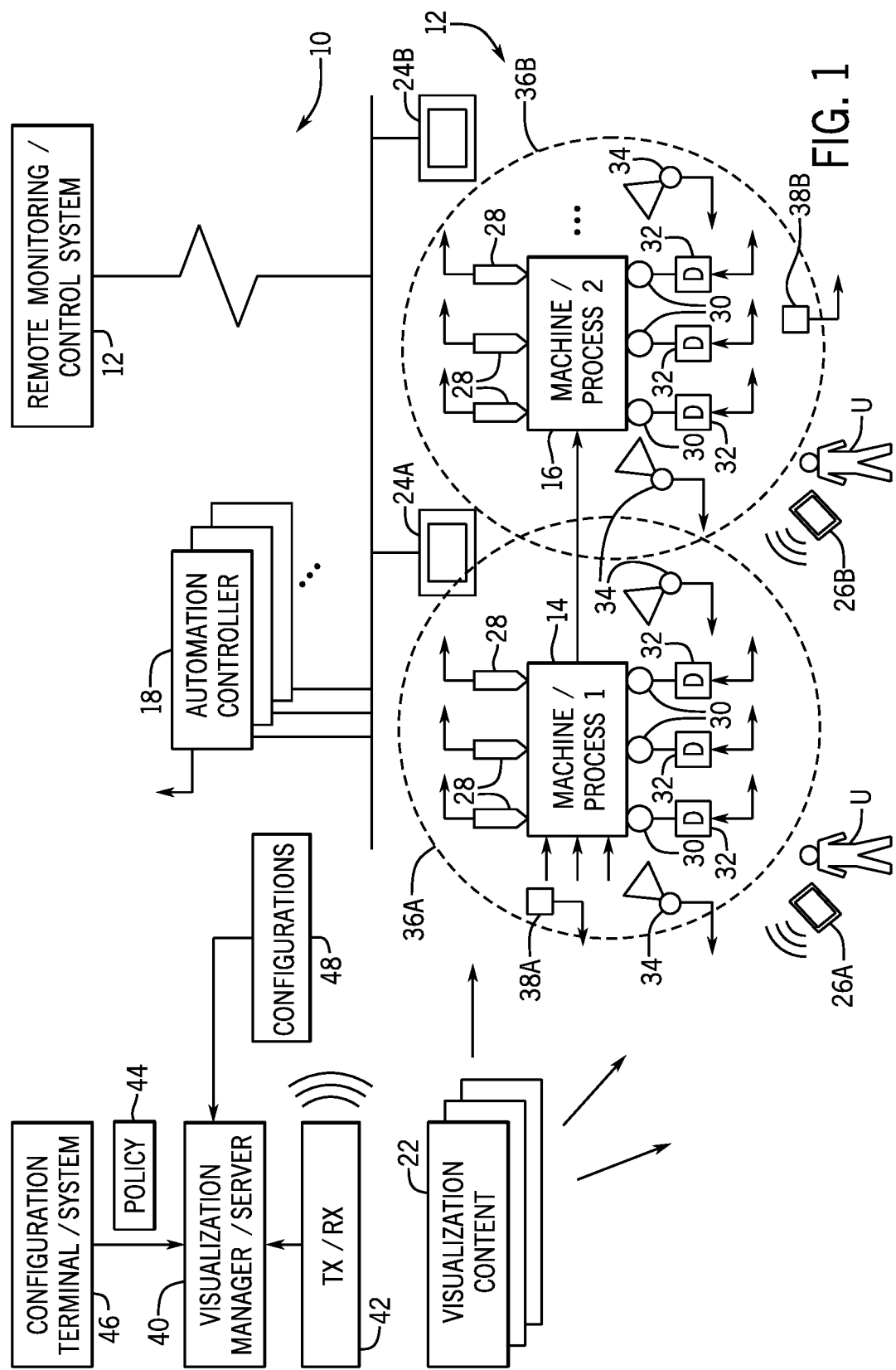
FIG. 1 is a diagrammatical representation of an example automation system for monitoring and controlling a machine or process and utilizing visualization technology of the type disclosed.

FIG. 1 illustrates an example automation system 10 employing visualization technology that enables users to view multiple views and screens combined in a single presentation that can be created, viewed, interacted with, and altered in automated and manual ways. The system may be incorporated for the control and/or monitoring of any machine or process system 12, which itself may comprise multiple machines or processes 14 and 16. In many applications, these may be controlled by dedicated control devices, such as one or more automation controllers 18. These controllers may be located at, in or on the controlled and/or monitored system (e.g., mounted on the equipment or in close proximity to it, on a factory or facility floor, etc.), or in some cases may be at least partially remote from the equipment (e.g., in control rooms, etc.). In some embodiments, such monitoring and control components may be coupled to one or more machines (and other equipment) via networks 20.

As discussed in greater detail below, the system 10 allows for useful data in the form of visualizations to be delivered to personnel utilizing, overseeing, controlling, maintaining, or otherwise interacting with the machines and processes. In particular, data comprising visualizations of the systems, parts of the systems, schematic views of the systems, actual images of the systems, data relating to the operation of the system (both in real or near-real time and historically) may be provided that include visualizations acquired from multiple different sources. In the illustrated embodiment, visualization content, indicated generally by reference numeral 22, may be provided to multiple different users U, such as via one or more fixed-location HMIs, as indicated by reference numeral 24A and 24B, and by mobile or hand-held devices 26A and 26B. These may be hard-mounted on or near the controlled or monitored equipment, or may be generally retained in a location (e.g., via a tether). It may be noted that the thin-client HMIs may receive the visualization content via any suitable wireless technology (as represented for devices 26A and 26B), or via wired connections (e.g., network cabling and protocols), as indicated for devices 24A and 24B. The devices may be referred to as "thin clients", and may themselves be computer terminals, screens, monitors, tablet devices, smartphones, laptops, or any other device capable of receiving and displaying the visualization content. As used herein the term "thin client" is intended to convey that the visualization-generating applications or executable code is not run by or instantiated on the thin client device itself (though the device may be capable of such functionality, computation, online operation, browser searching and display, telephonic or video calling, etc.). Instead, the thin client devices receive data defining an image or screen (i.e., visualizations) that is simply interpreted and displayed by the devices. Advantageously, the devices may interact with the visualizations, such as by touching locations on a touchscreen of the devices, keyed inputs, voice commands, and so forth. In the automation context, such devices may be referred to as human machine interfaces ("HMIs"), or "thin client HMIs". As discussed below, the thin clients may perform useful tasks such as triggering visualization delivery based on certain events, authenticating and re-authenticating users, sharing of all or part of visualizations with others, and monitoring reduced-dataset visualizations where desirable, as defined by the configurations provided by a further component (that is, the visualization manager discussed below).

In many applications, the machines or processes will be instrumented with a range of sensors 28 that detect operating parameters of the equipment (e.g., voltages, currents, speeds, flow rates, positions, levels, item counts, etc.). Similarly, multiple actuators 30 will typically be present, such as motors, valves, positioning devices, and so forth. For such devices (particularly motors), drives 32 or other control components may be provided that apply controlled power to the actuators to carry out various automation functions (e.g., manufacturing, processing, material handling, etc.). Although the drives are illustrated as near the controlled actuators, in practice they may be situated in cabinets, racks, and so forth, and in some cases in the same enclosures or system locations as the automation controllers. Though not separately illustrated, the system will also typically include various power and monitoring devices, such as switchgear, relays, contactors, disconnects, and so forth, as well as meters, gauges, read-out devices, and the like.

Also illustrated in FIG. 1 are cameras 34 that may be positioned to capture still or moving images of all or a part of the equipment making up each machine or process, products made or handled by them, personnel interacting with them, and so forth. The captured images are reduced to transmissible data by each camera and the image data may be transmitted to any desired device, such as for inclusion in a visualization as discussed below.

It should be noted that the arrows to and from the sensors, actuators/drives, and cameras are intended to indicate that data is exchanged with these components. The data may include control signals, feedback signals, monitored data, instructions, or any other useful data that may serve an automation (e.g., control and/or monitoring) function. In some embodiments and for some components, the data is exchanged with automation controllers 18 or other control and/or monitoring equipment, while other data may be provided directly to servers and other devices that receive visualization content and compile the visualizations discussed below. In certain presently contemplated embodiments, the visualizations are accessed by the thin clients based upon pre-determined configurations and policies, and visualizations are generated, delivered to and displayed by the thin clients based upon these configurations.

In embodiments made up of multiple systems 14, 16, these may be positioned in or logically associated in zones 36A and 36B that may at least partially overlap as illustrated. Each zone, or portions of zones may be served by one or more components that allow for detecting the presence of a user U and/or a thin client HMI 26A, 26B, as indicated by reference numerals 38A and 38B. Such devices may be referred to as "resolvers" and serve to provide signals that can be detected by the thin client HMIs, or by other devices, or that provide indicia (e.g., bar codes) that can be detected or scanned to produce signals indicative of location. In general, the function of the resolvers is to either directly or indirectly provide indications of the presence of the user U or the thin client HMI in a zone or zones of the system. As discussed below, the visualization content, and particularly the combined visualizations created may be adapted according to such factors as the user, the user's role, the location, the thin client HMI device, time, machine conditions, event triggers, and so forth.

In the illustration of FIG. 1, some of the components of the automation system may be in data communication via one or more networks, as illustrated for the automation controllers 18 and HMIs 24A and 24B. Many other automation components may be networked in this manner, including components on or near the controlled or monitored machines or processes, and components and systems located on-site or remote from the machines or processes, as indicated by block R. Whether connected by wired or wireless network links, any of these components that generates visualizations may be accessed to provide the visualizations to the thin client HMIs (and/or to other HMIs and components).

In the illustrated embodiment, an example device for enabling access to the visualizations takes the form of a "visualization manager" or server 40. The visualization manager may itself comprise one or more servers or other processing components capable of accessing or permitting access to data defining visualization content from multiple other components that themselves produce the content. The visualization manager is coupled to or includes interface circuitry 42 for transmitting data between the manager and HMIs (e.g., for authentication) and for permitting access to visualizations on the thin client HMIs, such as based on policies defined by one or more operators and stored on the manager. As discussed below, in operation, the visualization manager receives data indicative of such factors as identifications of the thin client HMIs, their location, their users or the user roles, event triggers, and so forth, and based upon permission policies incorporating such information, permits access by the thin client HMIs directly to visualizations generated by one or more other components, which may be referred to as industrial automation visualization sources. Here again, and as also discussed below, these policies allow for highly customized provision of visualizations from visualization sources and for creation of derivative visualizations, such as partial visualizations, "faceplate" or reduced or limited dataset visualizations, and so forth, which may be based on factors such as the particular user, the user's particular role, the particular location where the visualizations may be viewed and/or interacted with, the particular thin client HMI device, the particular time, particular machine conditions, and so forth. It may be noted that one or more of the visualizations making up the delivered and displayed visualization content may also be adapted based upon such factors, though other visualizations may be unchanged or otherwise specified. Also, as discussed below, the visualizations accessed and displayed on one or more of the thin client HMIs may allow the user or operator to alter or otherwise interact with one or more of the visualizations, such as to carry out control functions in conjunction with an originating source, such as an automation controller, motor controller or drive, etc.

The policies may be developed and configured, along with definition and configurations of the visualizations via a configuration terminal/system 46. Software, firmware or a combination may be executed on the configuration terminal to select the particular visualizations desired, the users, the user roles, the locations, the devices, and any other relevant factors or data that will form the basis for acquiring the desired visualizations from source devices, compiling or defining any derivative visualizations (e.g., nameplate visualizations based on templates), and displaying the visualizations on the devices in accordance with the relevant factors. The collection of rules established in this way are the "policies" implemented by the visualization manager.

In operation, the visualization manager itself will not typically execute or instantiate applications that produce the visualization content that is accessed and displayed, but based on the policies, refers to configuration data 48 to permit the thin clients to access such content from other devices where the applications are running. In some cases, the manager may compile visualizations from data from the data sources and deliver them to the thin client HMIs. The sources may include, for example, automation controllers, and other computers controlling and/or monitoring the machines or processes, computers on which models, schematics, documentation, historical data, or any other useful visualization content are stored or created. The configurations for regulating access by the thin clients by the visualization manager may also cause the thin clients to access camera inputs in the form of streaming image data that can be incorporated into one or more visualizations. The ability to store and provide configurations for receiving and accessing these visualizations allows the visualization manager to play a role that is provided by none of the contributing visualization data sources, and in a manner that reduces or eliminates the need for a programmer or user to separately access or separately display the individual visualizations (e.g., reducing the need to page or flip through different screens providing different information).

In general, existing technologies may be used to allow for access and display of the visualizations, and for interacting with the visualizations to cause the sources to take certain actions. Such technologies may include, for example, remote desktop applications, or similar techniques. Such techniques allow for real-time or near-real time network mirroring of the sources' graphical display on the thin client HMIs. However, as mentioned above, the applications generating the visualizations do not themselves need to be executed on the thin client HMIs. Rather, the thin client HMIs merely receive and display the visualizations, and may permit interactions, such as to access other sites or remote information, command certain permitted functions to be performed by the source where the applications are running, and so forth. In the industrial automation context these may include some or all permitted control operations that can be done by the source, such as in the case of an automation controller or motor drive.

Figure 2:
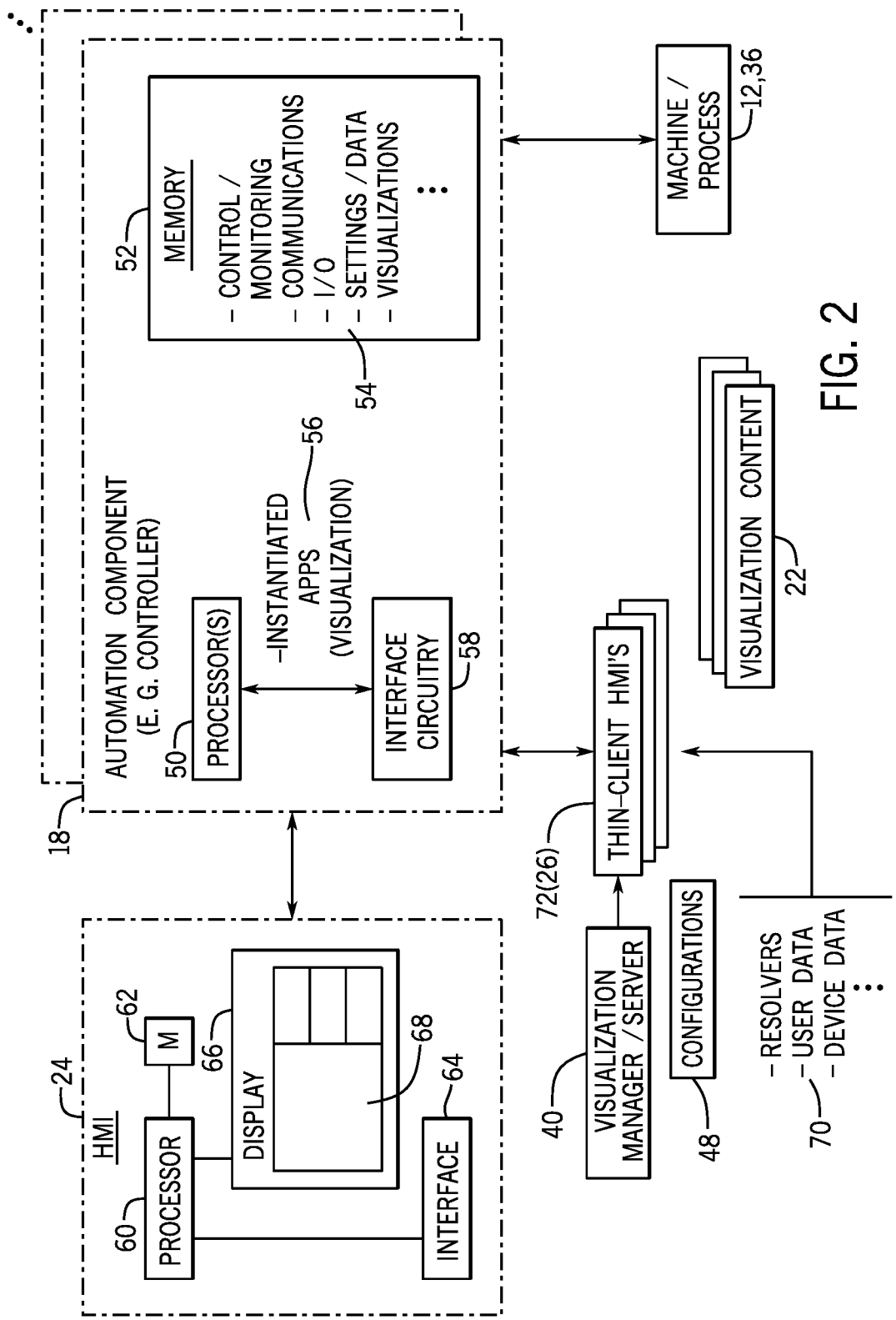
FIG. 2 is a diagrammatical representation of certain of the functional components of an example visualization system including a server or visualization manager for providing visualizations to one or more thin client HMIs.

FIG. 2 illustrates certain components of the system of FIG. 1 in somewhat greater detail. In the illustrated embodiment, one or more automation components 18, such as an automation controller, provides visualization content (e.g., whole or partial pages or screens, components of visualizations, such as virtual instruments, virtual push buttons, schematics or virtual representations of the machine or system, or a portion of it, etc.). The content may be provided by a processor 50 acting on instructions stored in one or more memory circuits 52, which may be on-board or off-board of the automation component. In general, for automation applications, as indicated generally by reference 54, the memory may store control and monitoring instructions (e.g., code that, when instantiated or executed performs pre-determined monitoring and/or control functions), communication instructions (e.g., for exchanging data in accordance with standard communications protocols), input/output data (e.g., for addressing, accessing, and storing data from sensors, and commands for actuators), various system and component settings and related data, and the visualization definitions for creating the desired visualizations based upon available data. The processor (or multiple processors, or multiple cores of a multi-core processor) may then instantiate or execute one or more applications for generating the desired visualization. In the present embodiment, as least these applications are run on the automation component, which then comprises a visualization content source for the thin client HMIs. The component will also include interface circuitry that allows for exchange of data (including the visualization content) with external devices, such as the thin client HMIs.

As noted above, the visualization manager retains configurations that permit the thin client HMIs to access visualizations or that define derivative visualizations based upon data available from the content sources, and to display this content in accordance with the policies stored on the visualization manager. One such device may be an adapted HMI 24. The HMI may be the same as or similar to prior art HMIs, but in the case of the derived visualizations (e.g., reduced, limited, nameplate) contemplated by the present disclosure, these will only receive and display the visualizations without creating them internally. That is, insomuch as the accessed and derived visualizations are concerned, the HMIs 24 may act here as thin clients. They may comprise one or more processors 60 for processing (e.g., combining) the received visualizations, as well as memory circuitry 62 storing instructions and configuration data for such operations. One or more interface circuits 64 allow for data communication with other devices (e.g., the automation component where desired, and the visualization manager 40). A display 66, typically in the form of a screen display allows for provision of screens or pages, or portions of these to the user, including the visualization 68. It should be noted that in the overall system, any HMIs may also be of a conventional type that are in direct communication with a component (e.g., an automation controller) for receiving and displaying content, and for acting on the content in conventional manners. In such cases, the system offers back-compatibility by allowing the use of conventional HMIs, as well as thin client HMIs. Also, illustrated in FIG. 2 are a series of data sources 70 from which the thin client HMIs, based upon the configurations from the visualization manager 40, may access the visualizations, and display the visualizations in accordance with the established policies. These may include, for example, cameras, resolvers, user data (e.g., input automatically, semi-automatically, or manually by human operators), device data (e.g., preconfigured or provided by manual input or automated detection).

Figure 3:
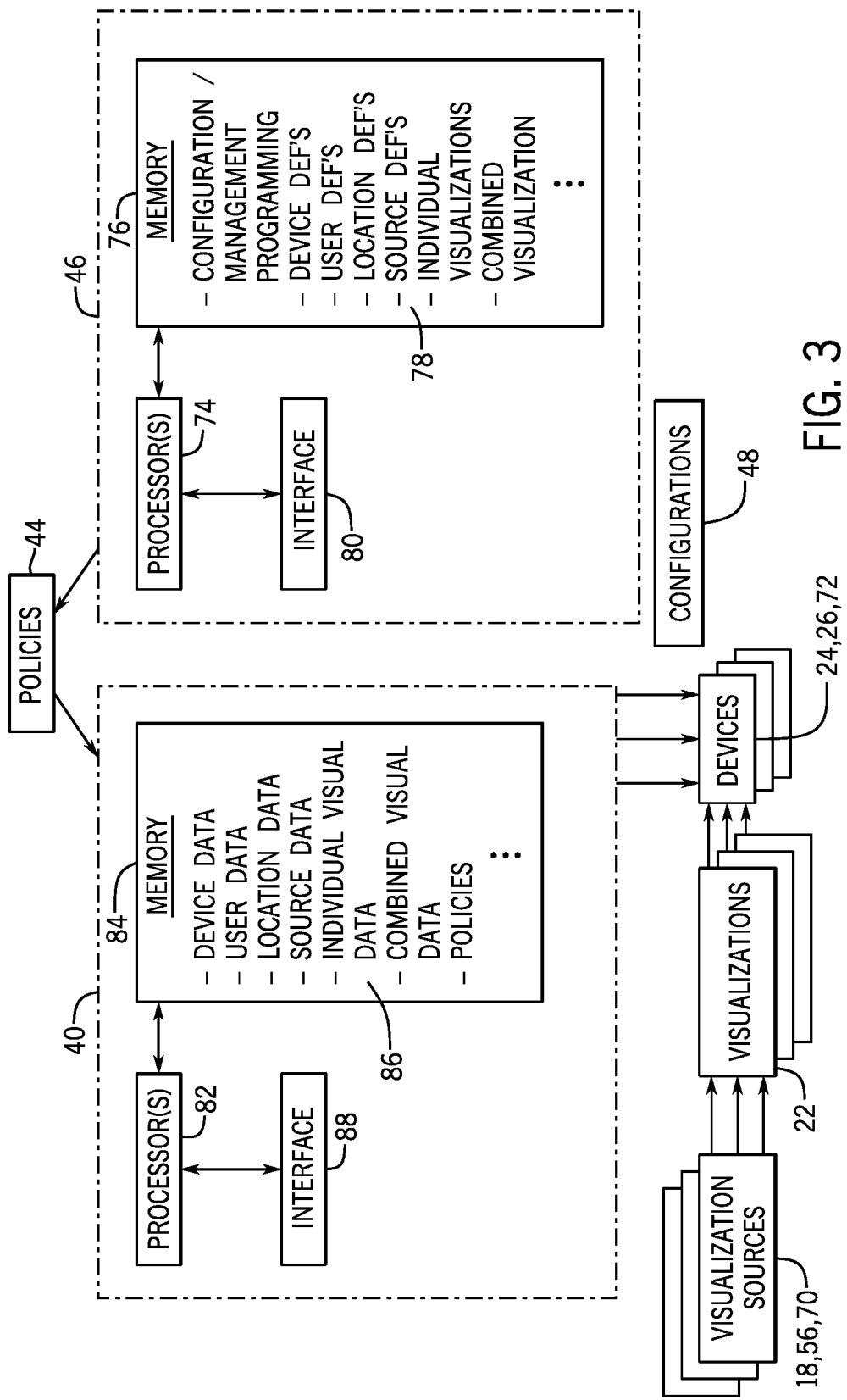
FIG. 3 is a diagrammatical representation of certain components of an example server or visualization manager and configuration terminal for configuring, accessing and serving visualizations to thin client HMIs.

FIG. 3 illustrates certain example components of the configuration terminal 46 and the visualization manager 40, and their interaction. The terminal 46 may be any dedicated or general purpose computer on which configuration applications are executed by one or more processors 74 based upon programming stored in one or more memory circuits 76. The memory may store the configuration programming and relevant data and definitions, as indicated by reference 78. The configuration application may comprise many different screens and interfaces (some illustrated and discussed below) that allow for establishing the policies 44, and for defining the visualizations to which access is allowed from various content sources (e.g., automation controllers, cameras, etc.). As noted above, the policies may be established based upon identification and definition of the thin client devices, the users, the locations, data and content sources, event triggers, the individual visualizations to be reduced or derived from available data. The terminal may comprise any desired interfaces 80 for permitting user (programmer) interaction for establishing the policies, as well as for communicating the policies and any associated data to the visualization manager 40.

The visualization manager 40 receives the policies 44 and configurations of visualizations, acts on them to allow the thin client HMIs 24, 26, 72 to access, where desired compile, display, and interact with the visualizations. The visualization manager will include one or more processors 82 and memory circuitry 84 that stores code 86 executed by the processors for implementing the policies, accessing the visualization configurations, and other relevant data for implementing the policies. In the illustrated embodiment, the code stored in the memory may include device data, user data, location data, content/visualization source data, individual visualization data, derivative visualization data, and in general, the policies that relate all such data for the access of the visualization content by the thin client HMIs from the visualization sources (e.g., automation controllers), and allow for interaction with the visualizations. Here again, any desired interface circuitry 88 may be provided to permit user interaction with the visualization manager, and for network communication (wired and/or wireless) of the configurations.

The policies and their use in providing relevant visualizations to the thin client HMIs and their users may proceed as outlined in the publication Relevance for ThinManager 8 from Automation Control Products of Alpharetta, Ga., and online from http://www.thinmanager.com/support/manuals/files/TM_8_Relevance_Manual.pdf, which is hereby incorporated into the present disclosure by reference, in its entirety. An example of the overall system and method for this is also provided in U.S. patent application Ser. No. 14/549,297, entitled "Systems and Methods for Automated Access to Relevant Information in a Mobile Computing Environment, filed Nov. 20, 2014 by Caine et al., which is also hereby incorporated into the present disclosure by reference.

Figure 4:
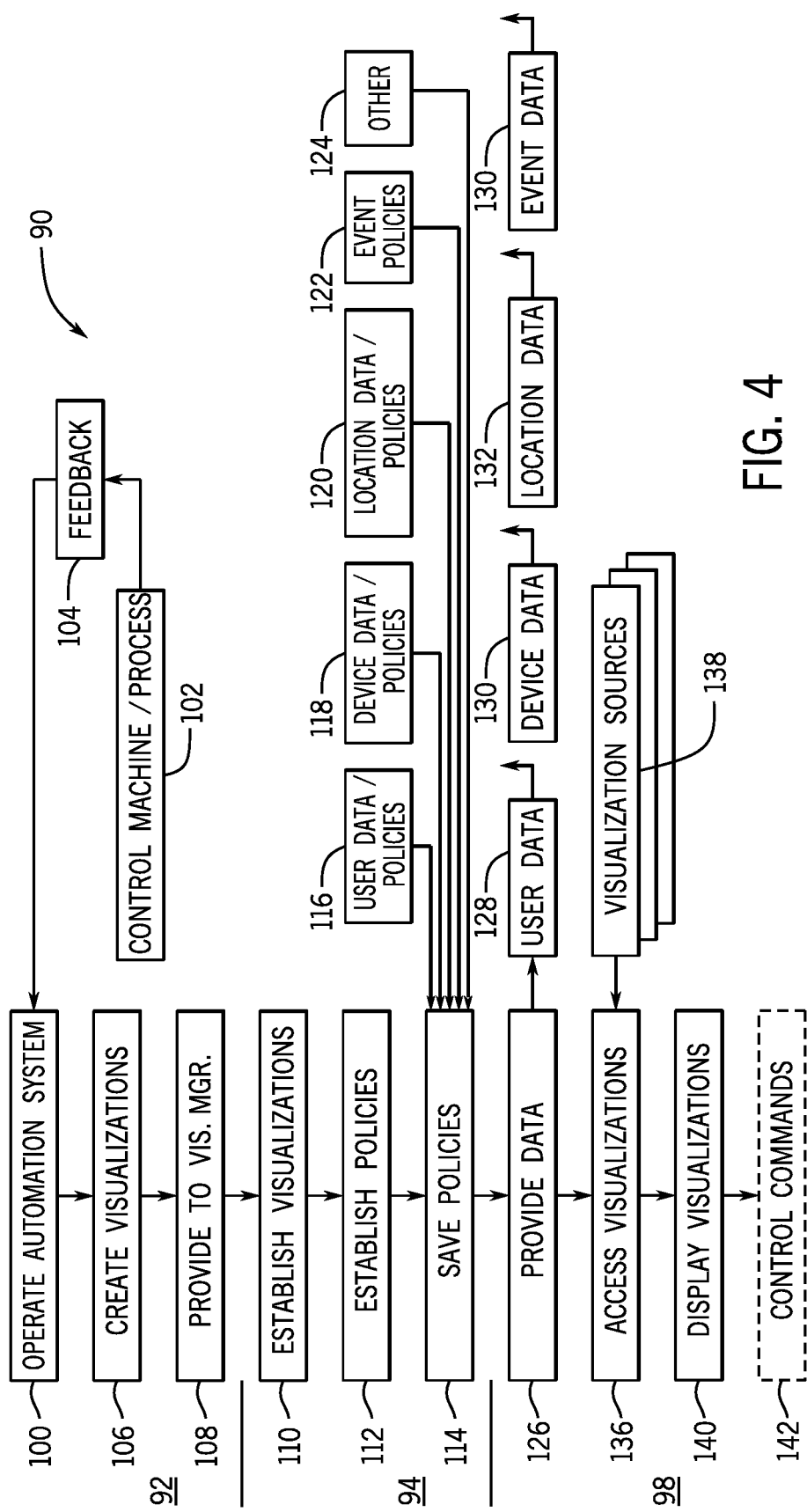
FIG. 4 is a diagrammatical representation of an exemplary process for configuring, accessing, and displaying visualizations to one or more thin client HMIs.

FIG. 4 illustrates example logic 90 for operations involving the access to and display of visualizations. The logic may be viewed in terms of certain phases involved in creating and using the visualizations. For example, in phase 92 the underlying visualizations are created and provided; in phase 94 visualizations and policies are created, and relevant data is determined; and in phase 98 the visualization is created, displayed, and interacted with, or altered based on the policies. In practice, all of these phases may be ongoing and performed in real or near-real time during control and/or monitoring of the machines or processes.

In automation applications, in the first phase the automation system is operated to control one or machines or processes, as indicated at 100. Such operation will typically produce data and power signals that control the machine or process, as indicated at 102, such as by control of actuators as discussed above. Sensors will provide feedback 104 for regulation of this operation. At the same time, one or more of the automation devices (e.g., automation controllers, motor drives, HMIs, etc.) will create visualizations (e.g., real or near-real time views of the machines or processes, schematics, documentation, virtual instrumentation, camera views, or any other useful visual representations), as indicated at 106. These are then provided or made available to the visualization manager at 108.

In the next phase 94, the desired visualizations and any derivative visualizations are selected as discussed above, and the visualizations are defined and their configurations stored, as indicated at 110. At 112, the policies are also developed and stored as discussed above. During operation, then, the configurations are served by the visualization manager to the thin client HMIs, as indicated at 114. These may be provided based upon automatically determined or monitored criteria, user-input criteria, and so forth, as indicated by reference numerals 116, 118, 120, 122, and 124. Such factors may be continuously monitored to allow for changing individual or combined visualizations in accordance with the established policies.

In the further stage 98, during use, data may be provided at 126, including user data 128, device data 130, and location data 132, event data 134 (along with any other useful data) that may serve as the basis for implementing the policies and displaying visualizations determined to be most useful in accordance with the policies. At 136, the thin client HMI accesses the visualizations from sources, here indicated by block 138, as permitted by the policies. Utilizing the received individual visualizations, then, the combined visualization is compiled and displayed to the users on the thin client HMI device, as indicated at 140.

Any desired and permitted changes, interactions, and alterations may then take place as discussed above. Permitted interactions may be done by the user at 142, moving or modifying screens, initiating control commands, and so forth (if allowed by the application instantiated on the source device), or otherwise interact with the thin client HMI. It should be noted that where the thin client HMI has other functionality (e.g., as a network-connected device, phone, computer, etc.) such functionality is not generally precluded by the access, display, or interaction with the visualization.

Indeed, certain of the visualizations may allow for or include links to websites, network locations, IP addresses, or other tools that allow the thin client HMI to receive information, notifications, and so forth, or to provide information that might be useful to other components or users. As noted above, based on the policies, the content, including one or more of the visualizations may be altered or interacted with in real or near-real time by changing the user, the role, the device, or the location of the user or device, or upon the occurrence of a particular event.

Figure 5:
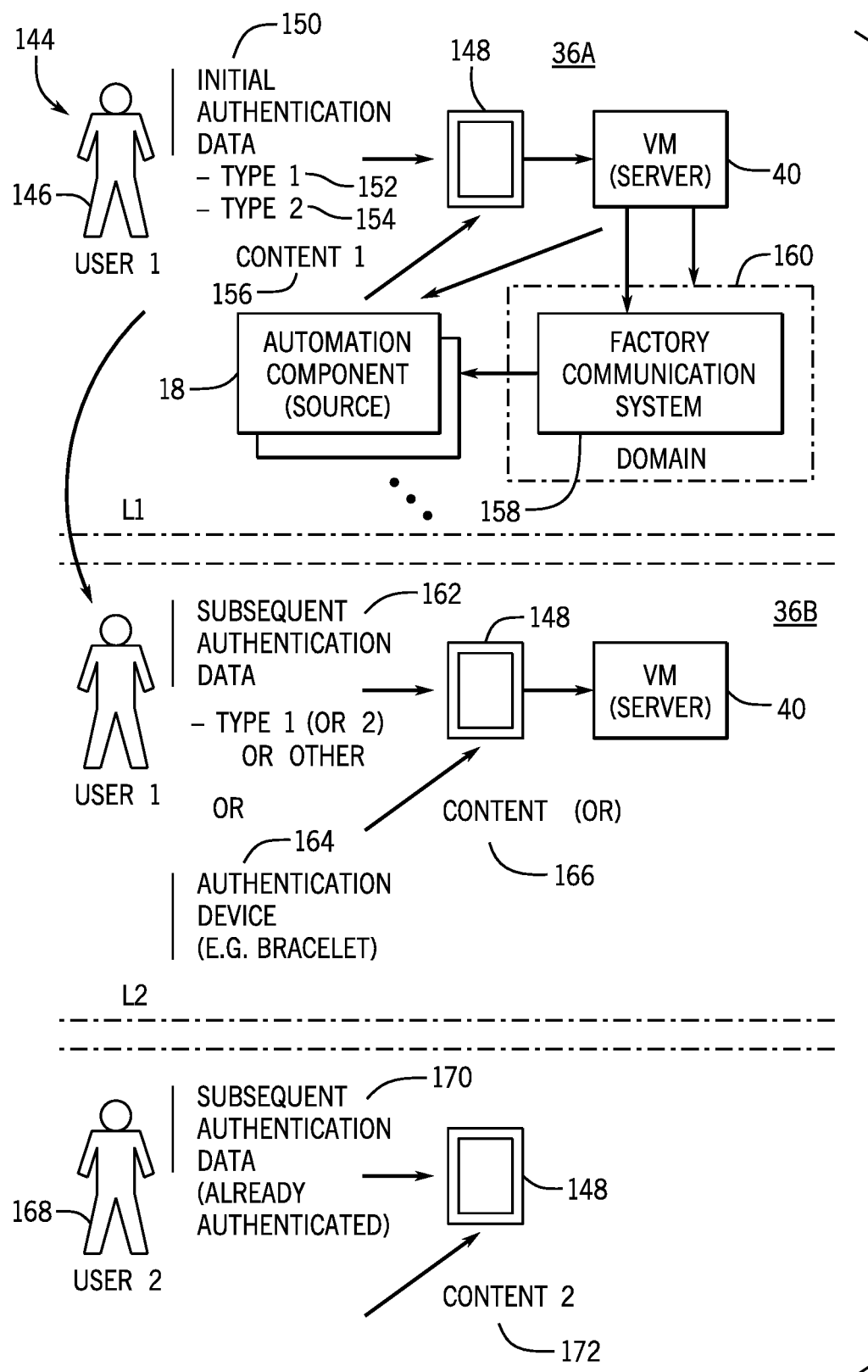
FIG. 5 is diagrammatical representation of an exemplary scheme for providing persistent authentication of a user receiving visualizations in accordance with aspects of the present disclosure.

FIG. 5 illustrates an exemplary authentication scheme 144 for allowing user authentication via a thin client HMI and for receiving visualizations from a source, such as an automation component (e.g., an automation controller). In the illustrated embodiment, a first user 146 will receive content via a thin client HMI 148 based upon authentication. Initial authentication, indicated by reference 150, may be based upon two or more types of data, indicated generally by reference numerals 152 and 154. Such multiple data requirements may be considered a "multi-factor" authentication. In some embodiments, such authentication may be based upon factors such as a user name and password. Many other factors may be used, and these may comprise more than two factors, as well as factors that may be considered in the alternative. Such factors may include, for example, fingerprint images, facial recognition data, voice recognition data, bar code and other machine readable code scans, and so forth. The factors or data derived from the inputs are received via the thin client HMI 148 and passed along to the visualization manager 40. Based upon the data, and the policies stored in the visualization manager, then, the user is permitted access to one or more visualizations, as indicated by reference 156 in the figure. As noted above, rather than pass through the visualization manager, these visualizations and their content will typically originate in the source where one or more applications are instantiated. In the illustrated embodiment, the source is an automation controller.

Mechanisms for maintaining authentication once initial authentication has been made may avoid passing along of passwords or other data that the user or system may wish to maintain confidential. Moreover, persistent authentication with reduced data required may greatly facilitate allowing users to freely move within automation environments while quickly receiving different visualizations adapted for locations, users, devices, events, times, and so forth. In the illustrated embodiment, a factory communication system 158 communicates with the visualization manager 40 to receive authentication data and to log the user into the factory communication system. In such embodiments, separate authentication processes used for the factory communication system may be leveraged to provide authentication, and persistent authentication to the user via the factory communication system. Such systems are commercially available, for example, from Rockwell Automation under the commercial designation FactoryTalk. The systems may log the user into a domain 160 and maintain the authentication as the user moves, interacts with the machine or process, and so forth.

FIG. 5 also illustrates the movement of the user 146 from one area or zone 36A to a different area or zone 36B. In current technologies, such movement may result in requiring the user to re-input all of the authentication information. In the illustrated embodiment, however, for subsequent authentications, only limited data is required as indicated by reference numeral 162. In some cases, this authentication data may be a subset of the data originally input for the initial authentication. For example, a user may be recognized, but required to re-input only a password, scan a fingerprint, scan the user's face, speak into the thin client HMI, scan a code, and so forth. It is also contemplated that devices may be used to assist in such authentication. For example, break-away bracelets or other physical keys or devices may be worn or carried by the user, and may facilitate re-authentication without inputting all of the initial authentication data, as indicated by reference 164. This subsequent authentication may be, therefore, considered a single-factor for reduced-factor authentication. As the user changes one or more criteria that are the bases for receiving the desired visualizations as established by the policies stored in the visualization manager, such subsequent authentication may be required. This may include changing of areas or zones, as indicated in the figure, timing out of a particular time-lapse, changing HMI devices, changing situations as indicated by event triggers, and so forth. In such cases, the visualization may be different as indicated by reference 166.

FIG. 5 also illustrates a subsequent authentication of a different user 168 on the same thin client HMI 148. Here it is assumed that the second user 168 has already completed the initial authentication for accessing visualizations. However, because the policies stored in the visualization manager 40 may call for determination of accessible visualizations for the second user based upon factors such as the user's identification, the user's role, the user's location, and so forth, it will not be assumed that the visualization content will be the same as for the first user despite that the thin client HMI 148 may be the same physical device, or even that the user and/or device are then located in the same area or zone as was the first user. Thus, after inputting the subsequent authentication data 170, the second user will receive the visualization content 172 adapted for that user, location, device, and so forth.

Figure 6:
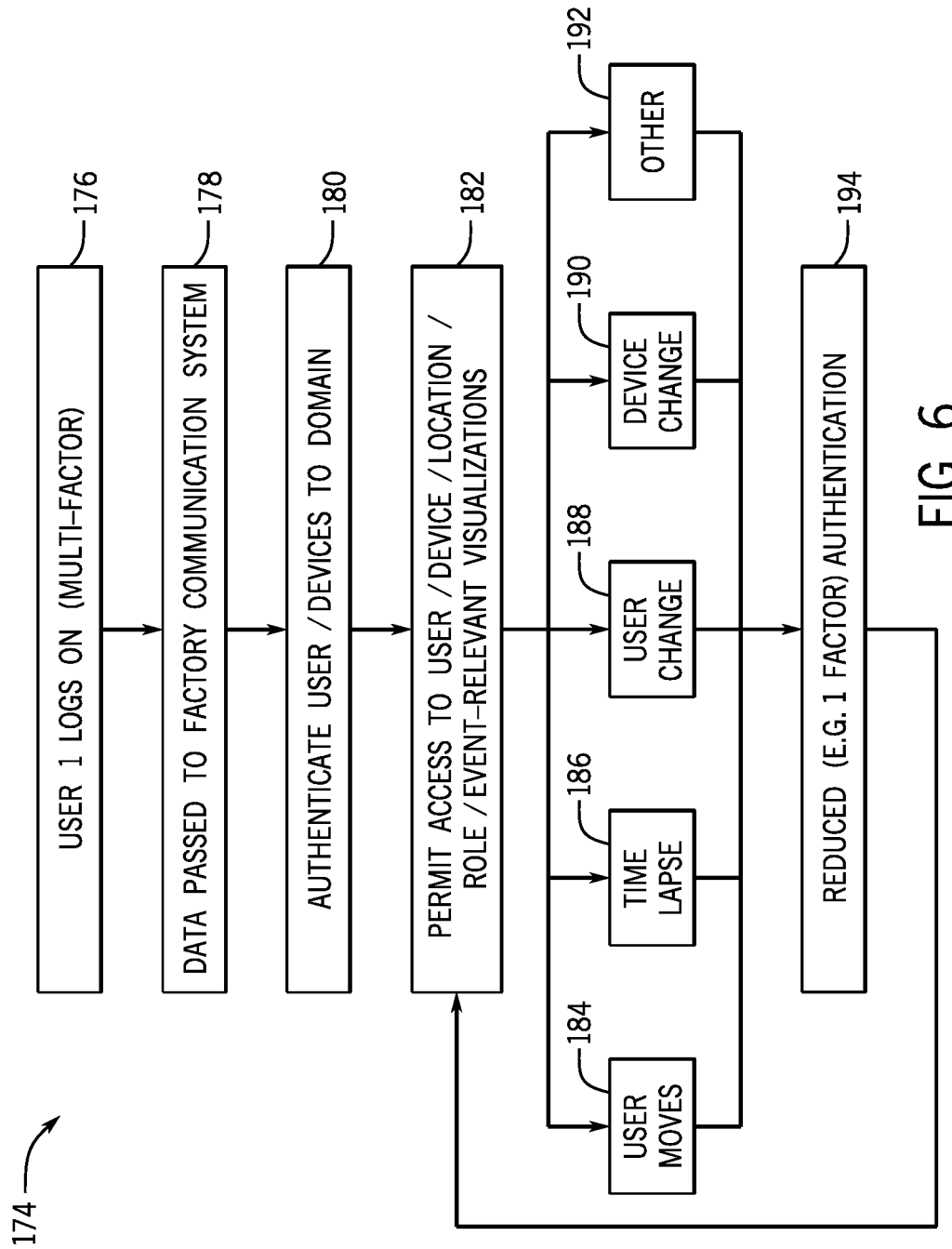
FIG. 6 is a flowchart illustrating exemplary logic for such persistent authentication.

FIG. 6 illustrates exemplary logic for such authentication, designated generally by reference 174. As noted above, the authentication process begins with the user logging into the system, typically via the thin client HMI at step 176. Again, it is contemplated that this initial authentication will be a multi-factor authentication to enhance security. At step 178 the multi-factor data may be passed on to the factory communication system, where such approaches used, already having been supplied to the visualization manager at step 176. At step 180 the user and device are authenticated, which may include authentication in the factory or installation domain as discussed above. Based upon the authentication, then, at step 182 the user use permitted access to any visualizations provided by the policies and originating in the visualization sources, such as automation controllers, workstations, and so forth. Again, such access, delivery and display will typically be based upon the user, the device (thin client HMI), the location, the user role, any existing or occurring event triggers, and so forth.

Once authenticated in the system, then, various events may cause the user to perform reduced factor re-authentication. These may include, as summarized in FIG. 6, movement of the user 184, lapse of a time interval 186, a change of the user 188, a change in the HMI device 190, or various other factors 192 that may be based upon security concerns of the institution. When prompted on the thin client HMI, then, the user simply provides the reduced factor authentication data at step 194, and may re-access any allowed visualizations based upon the policies of the visualization manager.

It should be noted here that the persistent authentication techniques contemplated are not limited to use with thin client HMIs, but may be used with any interfaces, including conventional HMIs and other devices for accessing and displaying visualization content. By way of example, a user may be authenticated at a terminal, such as by use of a security badge. A first scan of the badge on a shift (e.g., at any available HMI or terminal) may require him to enter his user name and password. For the remainder of the shift, then, the badge scan alone may be sufficient for authentication anywhere in the facility, and on any HMI, including fixed-location and mobile HMIs, thin client HMIs, and so forth. The persistent authentication information is centrally maintained and is system-wide. As another example, a user might establish an initial logon manually or as just described. Once authenticated, the user is prompted to establish a temporary PIN for the shift (e.g., at any available terminal or HMI). This PIN may then be all that is required for the remainder of the shift, but may be required again to re-establish authentication at the beginning of the next shift. The PIN can also be configured as permanent and can be used as another initial authentication factor.

The present techniques also contemplate establishing and providing reduced or simplified visualizations based upon data monitored for one or more automation components in real or near-real time. In particular, visualizations, some of which may be referred to as "nameplate" or "faceplate" visualizations may be compiled in an automation device, or in the visualization manager, and served to one or more thin client HMIs in accordance with the policies provided. For example, interesting and meaningful adaptations of available data may be offered to users, and particularly to specific users, based upon their identification, role, location (e.g., proximity to a particular component), and events arising with particular components or products, and so forth. Such reduced or limited visualizations may provide a rapid and easily understood "snapshot" of status, errors, health, operating parameters, and the like, and may provide a springboard or originating point for accessing more detailed information from one or more of the automation components, from other systems, or from external sources, including Internet sites, institution links, and so forth.

Figure 7:
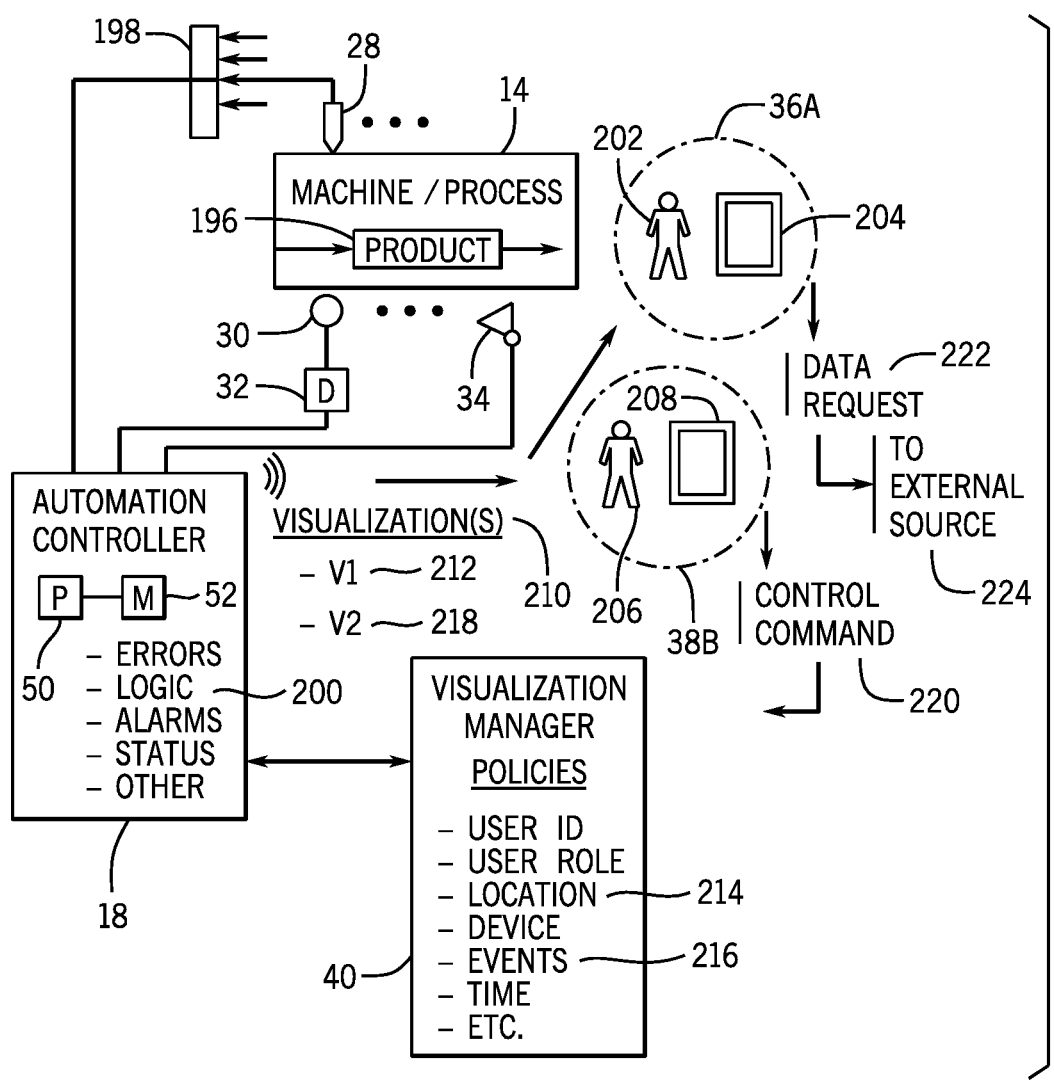
FIG. 7 is a diagrammatical representation of an exemplary scheme for delivering visualizations based upon a combination of criteria, including event triggers.

FIG. 7 illustrates an exemplary scheme for compiling and delivering such reduced or limited visualizations. In the illustrated embodiment the machine or process 14 is shown as making or handling a product 196. Here again, sensors 28 and actuators 30, such as motors under the control of motor drives 32, are part of the machine or process and aid in controlling and monitoring its operation. An input/output point 198 is illustrated for collecting feedback and, where appropriate, providing signals or commands to certain of the actuators or sensors. A camera 34 is also illustrated here for capturing images of the machine or process or of all or part of the product 196. All of these are coupled to an automation controller 18 which, as before, comprises one or more processors and memory. The memory may store a variety of operational data, including errors, control and process logic, alarms, status indications, and other data, typically, for example, electrical and physical operating parameters, such as currents, voltages, power, speeds, counts of products and other events, data identifying the components of the system, data identifying the component location, data identifying the component state (e.g., powered, unpowered, malfunctioning, etc.), and so forth.

FIG. 7 also illustrates multiple users in different zones in or around the machine a process. A first user 202 is equipped with a thin client HMI 204, while a second user 206 is provided with a thin client HMI 208. The first user is shown as be present in zone or area 36A, while the second in 36B.

As discussed above, based upon such factors as the user, the user role, zone or area, any triggering events, and so forth, the users are provided with visualizations 210. In particular, separate and different visualizations may be provided to each user. In the illustrated embodiment, a visualization 212 is illustrated as being provided to both users, although these may of course different based upon the user, the device, the location, the user role, and so forth. The provision of the visualizations, and particularly the access to the visualizations from the automation controller in the illustrated embodiment, are based upon the policies 214 stored within the visualization manager 40. In the illustrated embodiment, in addition to factors such as the user identification, the user role, the location, and the device, an event trigger criterion is employed as indicated at reference numeral 216. Such event triggers may include, for example, errors as detected by one or more industrial automation components, such as the automation controller, alarms established by the component logic, violations of access policies (by machines, parts of machines, products, and personnel), planned or unplanned status of one or more products, and so forth. By way of example only, the product 196 made or handled by the machine or process may require attention at certain stages, both planned and unplanned. Such events may be programmed to be included in the policies of the visualization manager. Similarly, unplanned status of the machine or process may be considered as a criterion. Upon the occurrence of such criteria, the policies are applied, and one or more visualizations may be delivered to the users, and particularly to specific users at specific location where they can attention to the events resulting in the trigger. The personnel are thus able to view any special visualizations based upon the event occurrence, and respond accordingly either via the thin client HMI, order directly by interacting with one or more machine or process components.

In the embodiment illustrated in FIG. 7, then, based upon the policies and any event triggers detected, a second or different visualization 218 may be delivered to one or more of the users. In some situations, one or more of the users may be enabled to provide a control command 220 by interacting with the visualization provided on the thin client HMI. In such situations, such control commands may be permitted for some users and not for others. Further, the visualization may allow for accessing additional resources, such as via a data request to 222. Such requests may be based upon links provided directly in the visualization, where appropriate. Such resources may be accessed via the Internet or any internal network of the institution, and may reach external sources 224, such as databases, websites, other team members, support personnel, and so forth.

It should be noted that the use of "event triggers" in connection with other criteria in the policies for delivering the visualization content may be used to provide the content by either "pulling" by the HMI, or by "pushing" to the HMI. In either case, the user may be provided with a notification of the availability of the visualization content, and then act to access and view it, such as by touching a portion of the HMI screen, or by any other selection method. It should also be noted that the event trigger-based distribution of the visualization content may not be limited the "thin client" HMIs that in most cases will not execute special software for display of the visualizations, but may be applied also for any interface, including conventional HMIs for accessing and displaying event-relevant visualization content. For example, in an automation setting, visualization content comprising a specific alarm and relevant information may be "pushed" to a maintenance person (e.g., based on that role)

who is nearest to the occurrence of the event giving rise to the alarm (e.g., location in a factory).

Figure 8:
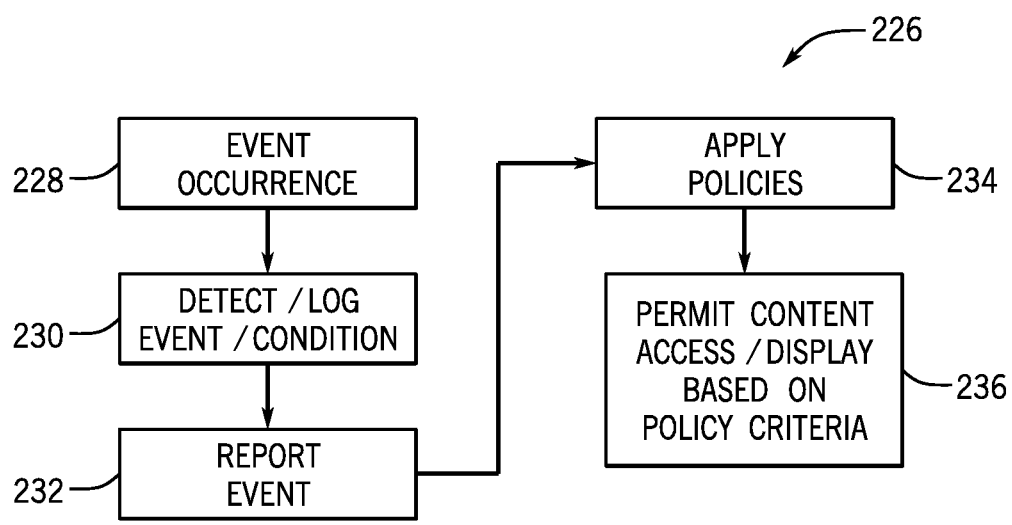
FIG. 8 is a flowchart illustrating exemplary logic for such event trigger-driven delivery.

FIG. 8 illustrates exemplary logic 226 for such event-driven visualization access and delivery. At step 228, the triggering event occurs, and it is detected at step 230. This will typically occur in an automation device that is the source of a visualization, such as an automation controller. The event is then reported that step 232, such as to the visualization manager which then recognizes the event as relating to a policy for the permitting of access to the new visualization. The policies are applied at step 234, and at step 236 access and display of the visualization are permitted based upon the programmed criteria. Of course, the criteria, and the event-driven visualization may allow for different content and different interactions than are available with other visualizations and content, often driven by the nature and desired response to the event.

Figure 9:
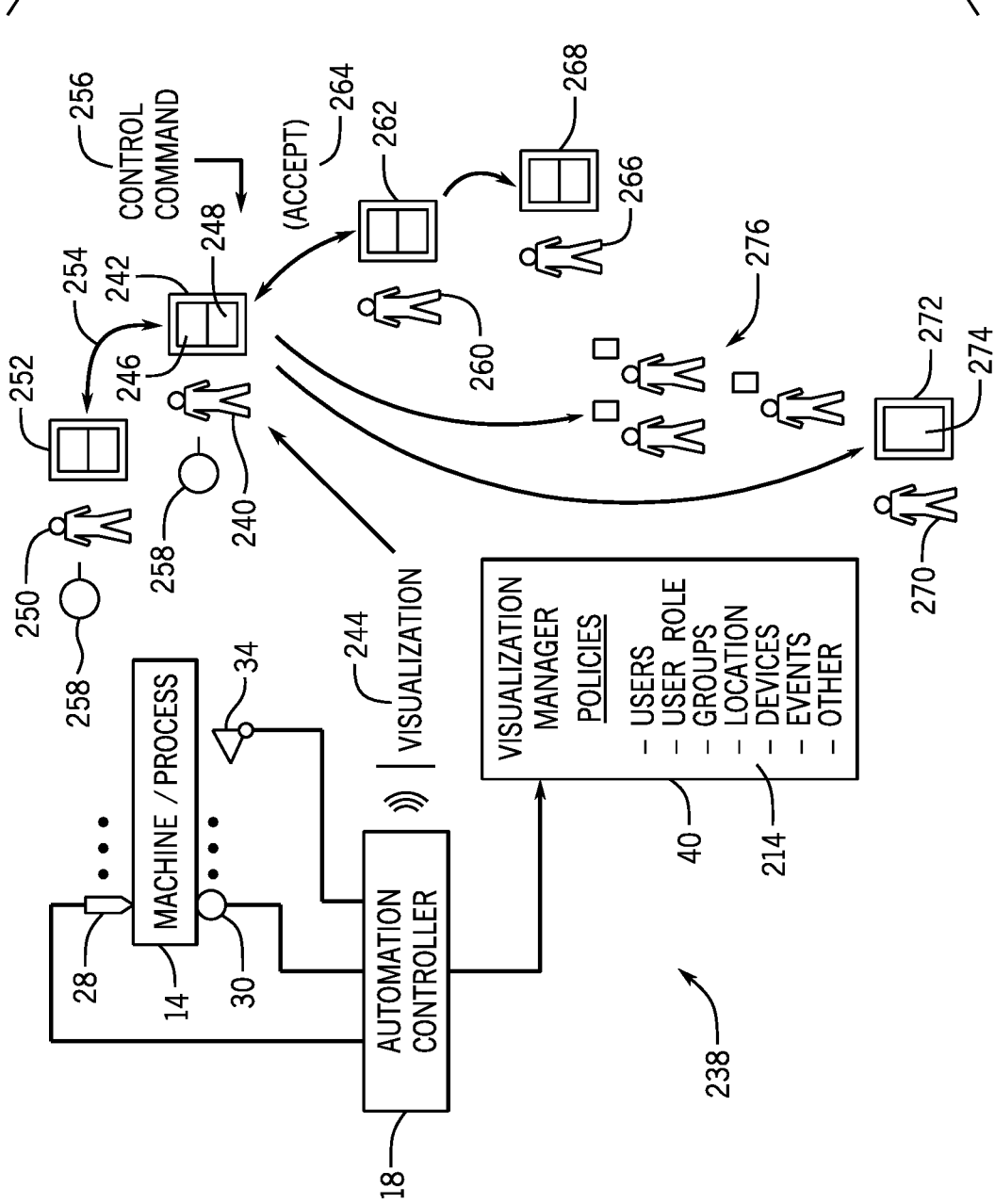
FIG. 9 is a diagrammatical representation of an exemplary scheme for Sharon, and particularly and talk sharing of visualizations between users and groups of users.

In accordance with other aspects of the present techniques, users may share one or more visualizations with one another either in accordance with policies stored in the visualization manager or even on an ad hoc basis that circumvents one or more of the policies. FIG. 9 illustrates an exemplary scheme for such sharing. Here again, the machine or process 14 is illustrated as equipped with sensors 28 and actuators 30 along with one or more cameras 34. Automation controller 18 is coupled to these components and aids in controlling the machine a process. The sharing scheme 238 allows a first user 240 provided with a thin client HMI 242 to receive a visualization 244 from the automation component as the source of the visualization in accordance with policies 214 stored on the visualization manager, as before. In this illustration, to make clear that the sharing may include all or part of a visualization, the visualization illustrated on the thin client HMI 242 is shown as including a first part 246 and a second part 248, either or both of which may be shared by the user.

When the user 240 desires to share the visualization with another user, this capability may be provided on the thin client HMI or within the actual visualization, depending upon the desires of the application and the visualization programming. Such sharing may pass through the visualization manager to verify that the second user and or device is authorized to receive the visualization. In certain cases, however, users may be able to share the visualization on an ad hoc basis depending upon the needs. In the embodiment illustrated in FIG. 9, a second user 250 is shown as equipped with a second thin client HMI 252. The first user 240 has executed a sharing function to allow the same visualization to be viewed on the second thin client HMI 252. In this case the entire visualization is available. Moreover, in certain applications, as in that shown here, to users may be able to share screens and perform two-way sharing as indicated by the double-ended arrow 254 in the figure. Where desired, however, and in accordance with the policies, it may be desired that only one of these users is permitted to perform control commands 256 allow by the visualization. Again, such commands will typically be returned to the source device so that controls of the machine or process can be implemented based upon the application instantiated on that device. Also illustrated in FIG. 7 are voice communications 258 that can be implemented via the visualizations or parallel applications or interfaces on the thin client HMIs. Where available, such voice commands allow for interaction with the visualizations, one or two-way communication between users, and so forth.

In accordance with another aspect, a further user 260 equipped with a thin client HMI 262 may be able to receive a shared visualization from the first user 240 based upon an acceptance 264 by the further user. That is, the further user may have reason not to desire viewing of the visualization, or at least to delay such access and display, and may do so by accepting or rejecting, or delaying the sharing, such as by interacting with a share request received from the first device. Still further, as illustrated in the figure, a downstream user and device, such as user 260 with device 262, may in some cases be able to share with a further user in a chain-type arrangement as illustrated for user 266 with device 268 in the figure. It may be desirable to limit such sharing based upon factors such as the user identification, the user role, the user location, and so forth, although these may be implemented by the permissions programming in the visualization manager, and in particular upon the policies.

FIG. 9 also illustrates other types of sharing that may be very useful in certain situations and applications. For example, additional sharing with a user 270 may be limited on that user's thin client HMI 272 to only a part of the visualization is indicated by reference 274. By way of example, maintenance or service personnel may need only part of a view being shown on the thin client HMI of a management user. Similarly, particular views from cameras or other devices may be shared on an as-needed basis with users proximate to those components.

Still further, the presently contemplated sharing techniques allow for designating individual users, individual roles, or groups of users and devices as indicated by reference numeral 276. In some embodiments, the user sharing a visualization may designate a specific role, such as maintenance personnel, for viewing a desired visualization. Where certain users are in a specific area, moreover, only those users may be designated to see a visualization, such as for reacting to a condition of the machine or process. Still further, on an ad hoc basis, the sharing user may select individual users for such sharing, effectively creating a desired group. In practice, any available criteria may be combined to provide rich and meaningful capabilities for sharing based upon the needs occurring in the automation environment. Where desired, other technologies may be leveraged to enhance such sharing, including definitions of groups, message groups, teams, and so forth. One such technology is available from Rockwell Automation under the commercial designation TeamONE, which provides a platform for enhanced sharing of automation-related information between many users in useful and creative ways.

Furthermore, different approaches may be employed for this sharing. Because the visualizations originate from the source, and the HMIs contemplated here are thin client HMIs that do not themselves run the underlying application that produces the visualizations, all of the shared visualizations may originate from the automation controller or other a component source and be accessed by the sharing device and the other devices with which the visualizations are shared. In other implementations, the visualization, or part of it may originate from the sharing device and be sent to the other devices by wireless communications of any suitable technology. When sharing is performed, such sharing may then terminated by the initial sharing user, by the downstream users, by the visualization manager, or by a change in situation, such as a user moving from a zone in which the sharing was permitted.

Figure 10:
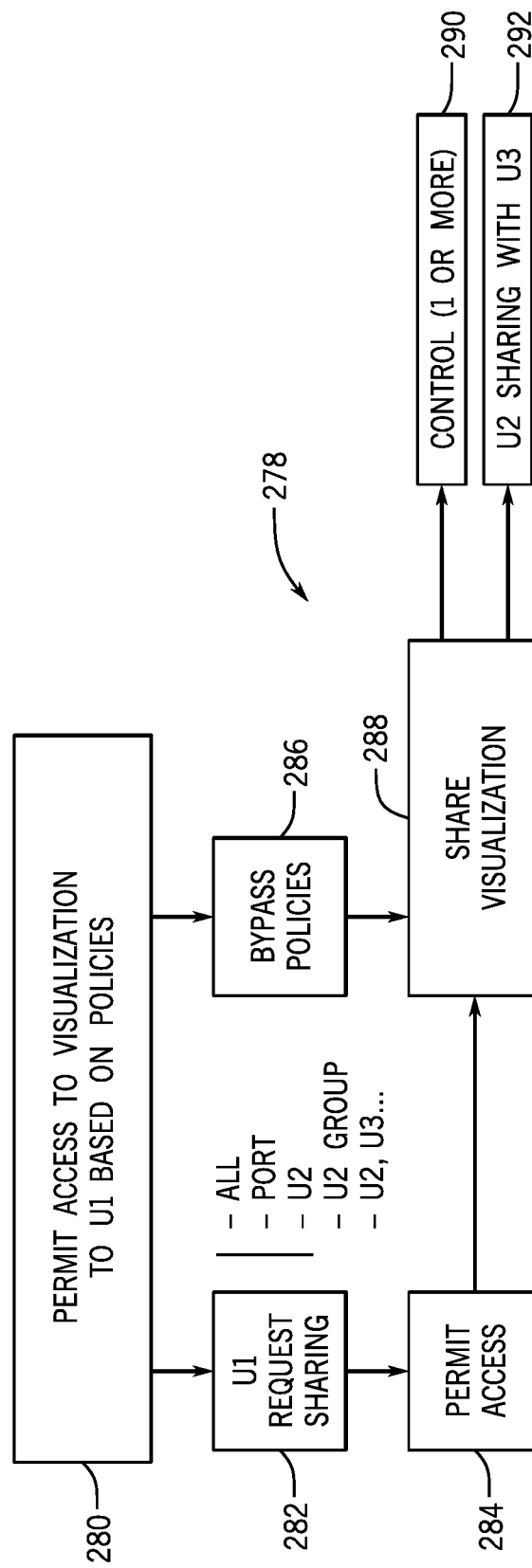
FIG. 10 is a flowchart illustrating exemplary logic for such sharing.

FIG. 10 illustrates exemplary logic for such sharing, designated generally by reference numeral 278. The process begins with permitting access to the visualization by a first user based upon the policies of the visualization manager as indicated in block 280. In one flow path, then, the first user may request sharing is indicating that reference 282, and this may be based upon one or more users, one or more locations, one or more groups, one or more roles, and so forth. In this path, visualization manager verifies policies and permits access as indicated by reference 284. In certain circumstances, however, the sharing user may bypass these policies as indicated by 286 and provide all or part of a visualization directly. In either case, at step 288 the visualization or part of the visualization is shared between devices. Further actions may be permitted for all or some of the users, such as control actions as indicated by block 290, or further sharing indicated by block 292.

Here again, it should be noted that the sharing schemes contemplated are not necessarily limited to thin client HMIs, but may be used with conventional HMIs, and other devices as well, including computer terminals, mobile devices, fixed devices, and so forth. Indeed, the sharing may be extremely flexible such that intended users, for example in specific locations, may be provided access to shared visualization content on any available HMI or device (e.g., the nearest, or the one the user happens to then be using, regardless of the type). Moreover, the content being shared may be pushed or pulled may be independent instances of the same content with different permissions, depending upon who has received the information. For example, an operator could share content to the nearest maintenance person who could act to clear an alarm. The content may be the same, except that the maintenance person would have permission to clear the alarm although the operator who shared the content did not.

The present techniques may also allow for creation and display of reduced or limited visualizations based upon data available from one or more automation sources. In some cases, as noted above, such visualizations may be referred to as "nameplate" or "faceplate" visualizations, and may provide a simple and efficient snapshot of component, machine or process, or product status. Such visualizations may provide different information from that currently available in automation systems, and may be particularly useful in the present context insomuch as they may be provided to specific individuals, in specific locations, on specific devices, at specific times, and or in response to specific trigger events, which may all be defined and stored in the visualization manager discussed in the present disclosure.

Figure 11:
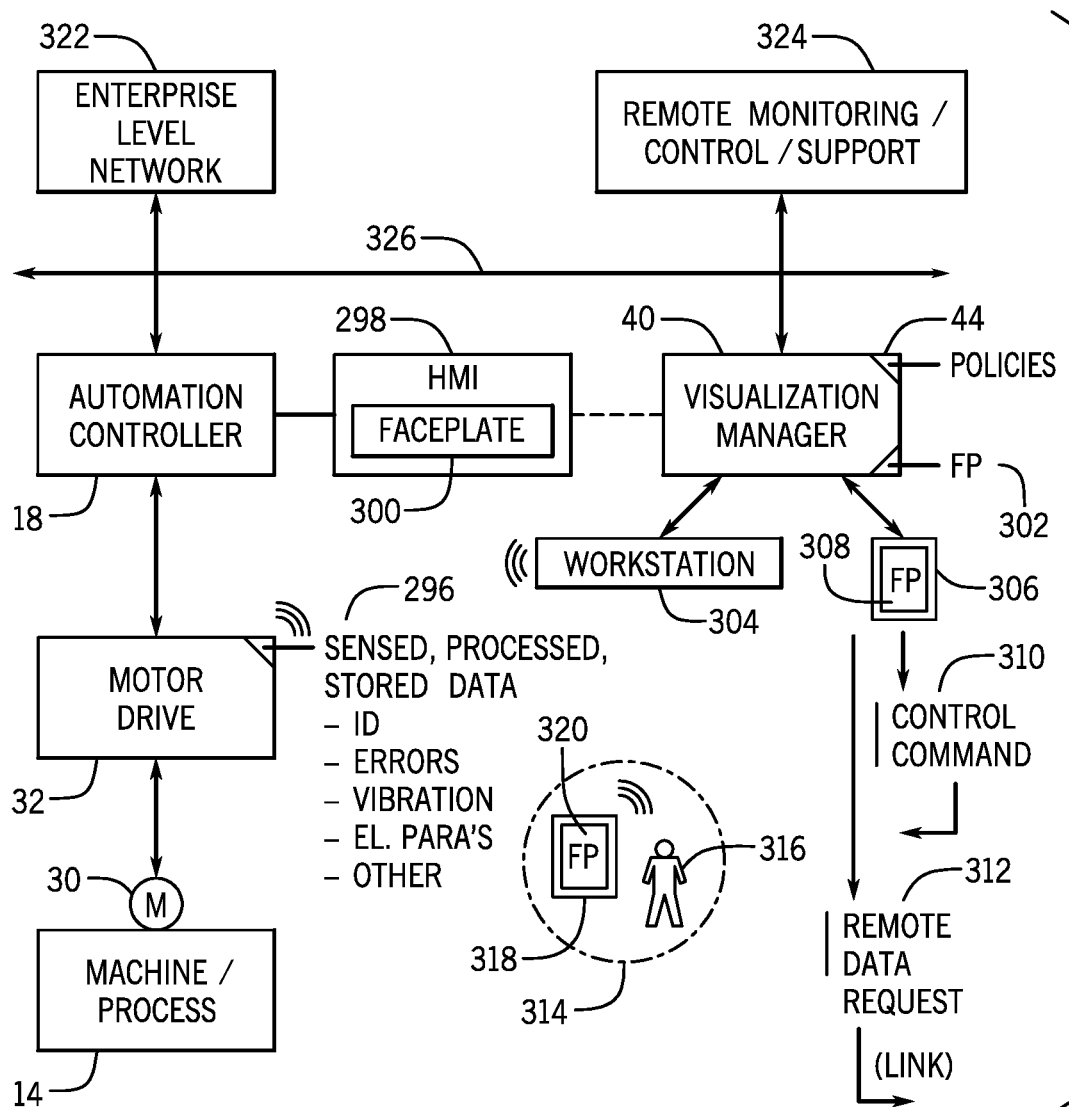
FIG. 11 is a diagrammatical representation of an exemplary scheme for providing reduced or limited visualizations.

FIG. 11 illustrates an exemplary scheme for providing such reduced or limited visualizations. Here again, the machine or process 14 is illustrated as being linked to an automation controller 18, such as through a motor 30 and motor drive 32. Other components, such as sensors, other actuators, cameras, and so forth may of course be provided as discussed above. The scheme 294 is based upon data indicated generally by reference numeral 296 that may be stored on one or more of the automation components, such as the motor drive 32. Of course, automation controllers 18 and other components may store much more information and other data for more than one component, and data that may be processed or derived from lower level component data. In the illustrated embodiment, data 296 may include sensed or processed stored data, component notifications, error codes, vibration information, electrical parameters, such as current, voltage, frequencies, power, and so forth, as well as any other desired data available from the component. Moreover, automation controllers, workstations and other automation elements, may have data that provides indications of much broader and richer analysis, including multi-component data, compilations of data, historical and real or near-real time data, and so forth. Indeed, it is presently contemplated that the data on which the reduced or limited visualizations are based may include at least some streaming data that is updated on a regular basis in the visualization during operation of the machine or process.

In the illustrated embodiment, the first HMI 298 displays the reduced or limited visualization, here called quote "faceplate" 300. As discussed below, this visualization may be provided by the automation controller, or another component such as the motor drive, or may be compiled based upon extraction of desired data and inclusion in a template or other data structure. The automation controller and HMI are shown as being coupled to the visualization manager 40 which stores the visualization access policies 44 as before. Here, in accordance with one possible embodiment, the nameplate visualization is illustrated as stored on the visualization manager 40 as indicated by reference 302. That is, the visualization manager itself may be programmed to carry out a role of compiling the visualization based upon information gleaned from the automation components. The visualization manager may serve the faceplate visualization to a workstation 304, or to a thin client HMI 306 where the visualization is displayed as indicated by reference numeral 308, or to another thin client HMI. The HMI may provide control commands based upon the visualization as indicated by reference 310, which will typically be returned to the automation device capable of performance of control, such as the automation controller or in this case the motor drive. Such commands may be made available to one or more users directly in the visualization, or by another visualization linked to the reducer or limited visualization and accessible by the user. As with the event-trigger visualizations, the action is, and particularly control commands available may be adapted for situations that gave rise to the access and distribution of the nameplate visualization. Moreover, the reduced or limited visualization may provide one or more links to allow for a remote data request as indicated by reference 312. This would be particularly useful insomuch as it is contemplated that the reduce or limited visualization is a subset of the data available, but may serve as a springboard for accessing additional data, such as historical information, catalog information, error logs, and so forth.

Is also contemplated that in some embodiments the faceplate visualization, or more generally the reduced or limited visualization may be provided to specific locations or zones 314 where a user of 316 is located and provided with a thin client HMI 318. This particularly useful insomuch as the user and device may be in close proximity to the automation components for which the state is summarized in the visualization. In some cases the visualization may be displayed in response to a prompt provided to the user, or originating from the user. Moreover, the user may, where allowed, image or scan components for accessing reduced or limited visualizations (e.g., barcodes on a component or area).

As noted, the visualizations may be generated by the individual automation components, or may be based upon a pre-established format or template that is stored either on the automation component, the visualization manager, or on another device, such as a workstation. Is contemplated that the data populated in the visualization may be provided in any useful graphical format, such as text, numerical fields, virtual gauges and graphical representations of components, and so forth. Moreover, the data will typically include component identification, component location, and so forth as well as real or near-real time operational data, which may include commanded operation or sensed operation (e.g., speeds, currents, voltages, power, counts, fluid levels, actuator states, and so forth).

Figure 12:
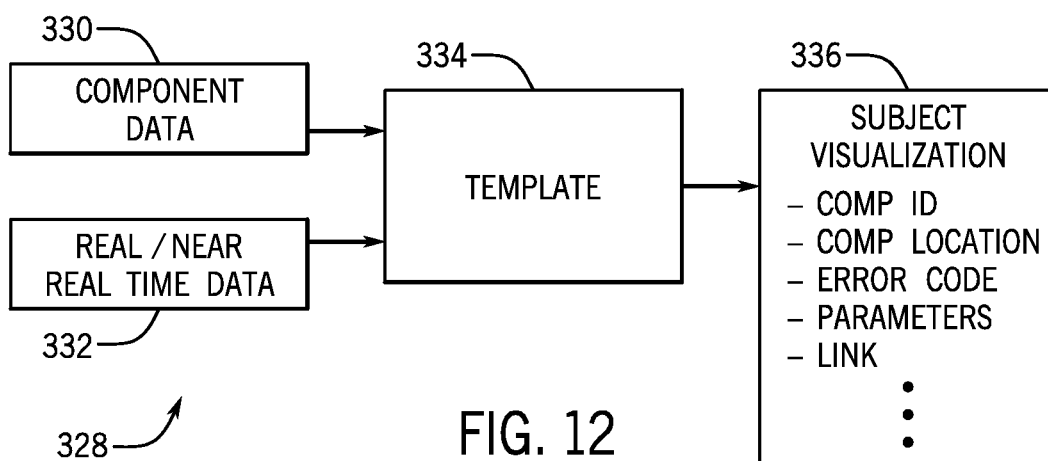
FIG. 12 is a flowchart illustrating exemplary logic for compiling and providing such visualizations.

FIG. 12 illustrates exemplary logic 328 for compiling and delivering such reduced or limited visualizations. As indicated by reference 330, the complement data is accessed, such as component identification data, manufacturing data, any names or designations used in a particular automation setting, or any other information that may assist the user in identifying the components for which the visualization applies. At block 332, real or near-real time data is accessed that can be presented in a raw or processed form in the visualization. Again, such data may originate from one or more of the automation components to provide a useful snapshot of operating conditions. At step 334 the data may be used to populate a template for the visualization. At step 336, the reduced or limited visualization is compiled that may include such information is the component identification, the component location, any desired error codes, operating parameters, links to additional information, and so forth. This visualization may then be delivered based upon the policies stored in the visualization manager.

It is contemplated, as well, that in some cases faceplates and templates may be developed by a manufacturer of a device, and stored and delivered/streamed to any device where the information is desired, such as from a central content providing system. In such cases, the data populating the faceplate may be determined by the component manufacturer or supplier (e.g., an OEM or system integrator), and real time or near real time data may be inserted into the faceplate, depending upon the data available and the field or content of the faceplate.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a visualization manager that, in operation, communicates with a human machine interface (HMI) to permit the HMI to access and display visualizations from one or more industrial automation visualization sources of a controlled machine or process, wherein the visualization manager is configured to provide initial user access to at least one of the visualizations based initially upon a multi-factor user authentication and thereafter permits subsequent access to at least one of the visualizations based upon a reduced-factor authentication;
wherein following initial multi-factor user authentication of a first user, the reduced-factor authentication data is required when the first user changes from an initial location to a different location; and
wherein a first visualization accessed and displayed at the initial location is different from a second visualization accessed and displayed at the different location.

2. The system of claim 1, wherein the HMI comprises a thin client HMI that does not itself run an underlying application that produces the visualization.

3. The system of claim 2, wherein the thin client HMI is a mobile device.

4. The system of claim 1, wherein the HMI is provided at a fixed location and the HMI is not a mobile device.

5. The system of claim 1, wherein the HMI is remote from the controlled machine or process.

6. The system of claim 1, wherein the first and second visualizations are provided based on relevance to the respective location.

7. The system of claim 1, wherein the first and second visualizations are provided based on a triggering event of the controlled machine or process.

8. The system of claim 1, wherein the first and second visualizations are provided based on a role of the user.

9. The system of claim 1, wherein the reduced-factor authentication comprises a fingerprint, facial recognition, voice recognition, or scanning of a badge.

10. A system comprising:
a visualization manager that, in operation, communicates with a human machine interface (HMI) to permit the HMI to access and display visualizations from one or more industrial automation visualization sources of a controlled machine or process, wherein the visualization manager is configured to provide initial user access to at least one of the visualizations based initially upon a multi-factor user authentication and thereafter permits subsequent access to at least one of the visualizations based upon a reduced-factor authentication; and
wherein following initial multi-factor user authentication of a first user on a first HMI at a first location, the reduced-factor authentication data is required when the first user changes from the first HMI to a second HMI at a second location.

11. The system of claim 10, wherein a first visualization accessed and displayed on the first HMI at the first location is different from the second visualization accessed and displayed on the second HMI at the second location.

12. The system of claim 11, wherein the first and second visualizations are provided based on relevance to the respective location.

13. The system of claim 11, wherein the first and second visualizations are provided based on a triggering event of the controlled machine or process.

14. The system of claim 11, wherein the first and second visualizations are provided based on a role of the user.

15. The system of claim 10, wherein at least one of the first and second HMIs comprises a thin client HMI that does not itself run an underlying application that produces the visualization.

16. A system comprising:
a visualization manager that, in operation, communicates with a human machine interface (HMI) to permit the HMI to access and display visualizations from one or more industrial automation visualization sources of a controlled machine or process, wherein the visualization manager is configured to provide initial user access to at least one of the visualizations based initially upon a multi-factor user authentication at a first time and after the first time permits subsequent access to at least one of the visualizations based upon a reduced-factor authentication; and
wherein different visualizations are provided to a user based on at least one of a location of the user, a location of the HMI, a role of the user, and a triggering event of the controlled machine or process, a first visualization being provided to the user at the first time based on the multi-factor user authentication, and a different visualization being provided to the user after the first time based on the reduced-factor authentication;
wherein the reduced-factor authentication is required when the user changes from a first location to a second location.

17. The system of claim 16, wherein the reduced-factor authentication comprises a portion of the multi-factor user authentication.

18. The system of claim 16, wherein a facility communication system, in operation, receives initial user authentication data based on the multi-factor user authentication and provides a persistent authentication of the user on the visualization manager.

19. The system of claim 16, wherein the reduced-factor authentication is required when the user changes from a first HMI to a second HMI.

* * * * *